(12) United States Patent
Wong

(10) Patent No.: US 10,302,842 B2
(45) Date of Patent: May 28, 2019

(54) OPTICAL TRANSMITTANCE ADJUSTMENT DEVICE

(71) Applicant: ChengFeng Optronics Corporation, Taichung (TW)

(72) Inventor: Ching-Fang Wong, Taichung (TW)

(73) Assignee: ChengFeng Optronics Corporation, Taichung (TW)

( * ) Notice: Subject to any disclaimer, the term of this patent is extended or adjusted under 35 U.S.C. 154(b) by 0 days.

(21) Appl. No.: 15/611,793

(22) Filed: Jun. 2, 2017

(65) Prior Publication Data
US 2018/0106947 A1    Apr. 19, 2018

(30) Foreign Application Priority Data
Oct. 18, 2016  (TW) .............................. 105133540 A

(51) Int. Cl.
G02F 1/03 (2006.01)
F21V 8/00 (2006.01)
F21S 11/00 (2006.01)
F21V 14/00 (2018.01)
G02B 5/23 (2006.01)
G02B 5/02 (2006.01)

(52) U.S. Cl.
CPC .......... *G02B 6/0043* (2013.01); *F21S 11/007* (2013.01); *F21V 14/003* (2013.01); *G02B 5/0215* (2013.01); *G02B 5/0221* (2013.01); *G02B 5/0273* (2013.01); *G02B 5/0294* (2013.01); *G02B 5/23* (2013.01); *G02B 6/005* (2013.01)

(58) Field of Classification Search
CPC .................................. G02B 6/0043
USPC .......................................... 359/244
See application file for complete search history.

(56) References Cited

U.S. PATENT DOCUMENTS

| | | | |
|---|---|---|---|
| 8,496,368 B2* | 7/2013 | Tiao | G02B 6/0043 362/607 |
| 2014/0146563 A1* | 5/2014 | Watanabe | G02B 6/0043 362/606 |
| 2016/0363709 A1* | 12/2016 | Lee | G02F 1/133615 |

FOREIGN PATENT DOCUMENTS

| | | |
|---|---|---|
| CN | 203818685 | 9/2014 |
| CN | 104597554 | 5/2015 |
| CN | 105824060 | 8/2016 |
| TW | M524485 | 6/2016 |

OTHER PUBLICATIONS

"Office Action of Taiwan Counterpart Application," dated May 8, 2017, p. 1-p. 4, in which the listed references were cited.

* cited by examiner

Primary Examiner — James C. Jones
(74) Attorney, Agent, or Firm — JCIPRNET

(57) ABSTRACT

An optical transmittance adjustment device including a light guide plate and an optical transmittance adjustment film is provided. The light guide plate has a first surface and a second surface, wherein the second surface is opposite to the first surface and has a plurality of light scattering microstructures. The optical transmittance adjustment film is located at a side of the light guide plate, and the light scattering microstructures are located between the optical transmittance adjustment film and the light guide plate.

10 Claims, 4 Drawing Sheets

OPTICAL TRANSMITTANCE ADJUSTMENT DEVICE

CROSS-REFERENCE TO RELATED APPLICATION

This application claims the priority benefit of Taiwan application serial no. 105133540, filed on Oct. 18, 2016. The entirety of the above-mentioned patent application is hereby incorporated by reference herein and made a part of this specification.

BACKGROUND OF THE INVENTION

Field of the Invention

The invention is related to an optical device, and particularly to an optical transmittance adjustment device.

Description of Related Art

General glass has high optical transmittance and therefore renders inferior performance in blocking heat and sunlight. Conventionally, the approach to block heat or sunlight is to utilize sunlight shading components such as attaching sunscreen sticker to glass or add curtains or window shades. For the past few years, although techniques have been developed to improve structure of glass so as to save the trouble of using sunscreen sticker or adding window shades, there are still a lot of issues need to be solved in known techniques.

SUMMARY OF THE INVENTION

The invention provides an optical transmittance adjustment device which may at least achieve the effect of blocking sunlight.

In the invention, an optical transmittance adjustment device including a light guide plate and an optical transmittance adjustment film is provided. The light guide plate has a first surface and a second surface, wherein the second surface is opposite to the first surface and has a plurality of light scattering microstructures. The optical transmittance adjustment film is located at one side of the light guide plate, and the light scattering microstructures are located between the optical transmittance adjustment film and the light guide plate.

In one embodiment of the invention, the light scattering microstructures are dots, respectively.

In one embodiment of the invention, the size of the light scattering microstructures falls within a range of tens of micrometers to hundreds of micrometers, respectively.

In one embodiment of the invention, the optical transmittance of the optical transmittance adjustment film falls within a range of 5% to 90%.

In one embodiment of the invention, the optical transmittance adjustment film is formed on the second surface.

In one embodiment of the invention, the optical transmittance adjustment film is a transflective film.

In one embodiment of the invention, the optical transmittance adjustment film is a photochromic film, and the optical transmittance adjustment device further includes a hard-coating layer. The photochromic film is covered by the hard-coating layer.

In one embodiment of the invention, the optical transmittance adjustment device further includes a transparent substrate, wherein the optical transmittance adjustment film is formed on the transparent substrate to construct an optical transmittance adjustment unit. An air gap exists between the optical transmittance adjustment unit and the light guide plate.

In one embodiment of the invention, the optical transmittance adjustment film is a transflective film or a photochromic film.

In one embodiment of the invention, the optical transmittance adjustment device further includes a first transparent substrate, a second transparent substrate, a first transparent conductive layer and a second transparent conductive layer. The optical transmittance adjustment film is disposed between the first transparent substrate and the second transparent substrate. The first transparent conductive layer is disposed between the first transparent substrate and the optical transmittance adjustment film. The second transparent conductive layer is disposed between the second transparent substrate and the optical transmittance adjustment film. The optical transmittance adjustment film is an electrochromic film. An optical transmittance adjustable device is constructed by the first transparent substrate, the first transparent conductive layer, the optical transmittance adjustment film, the second transparent conductive layer and the second transparent substrate. An air gap exists between the optical transmittance adjustable device and the light guide plate.

Based on the above, in the embodiments of the invention, with the light scattering microstructures that scatter the light beam entering the light guide plate, a proportion of the light beam emitted from the second surface of the light guide plate can be reduced. In addition, by using the characteristics of the optical transmittance adjustment film that absorbs or reflects the light beam, the proportion of the light beam transmitting through the optical transmittance adjustment film can be further decreased. Therefore, the optical transmittance adjustment device of the invention may at least achieve the effect of blocking sunlight.

In order to make the aforementioned features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF EMBODIMENTS

Figure 1:
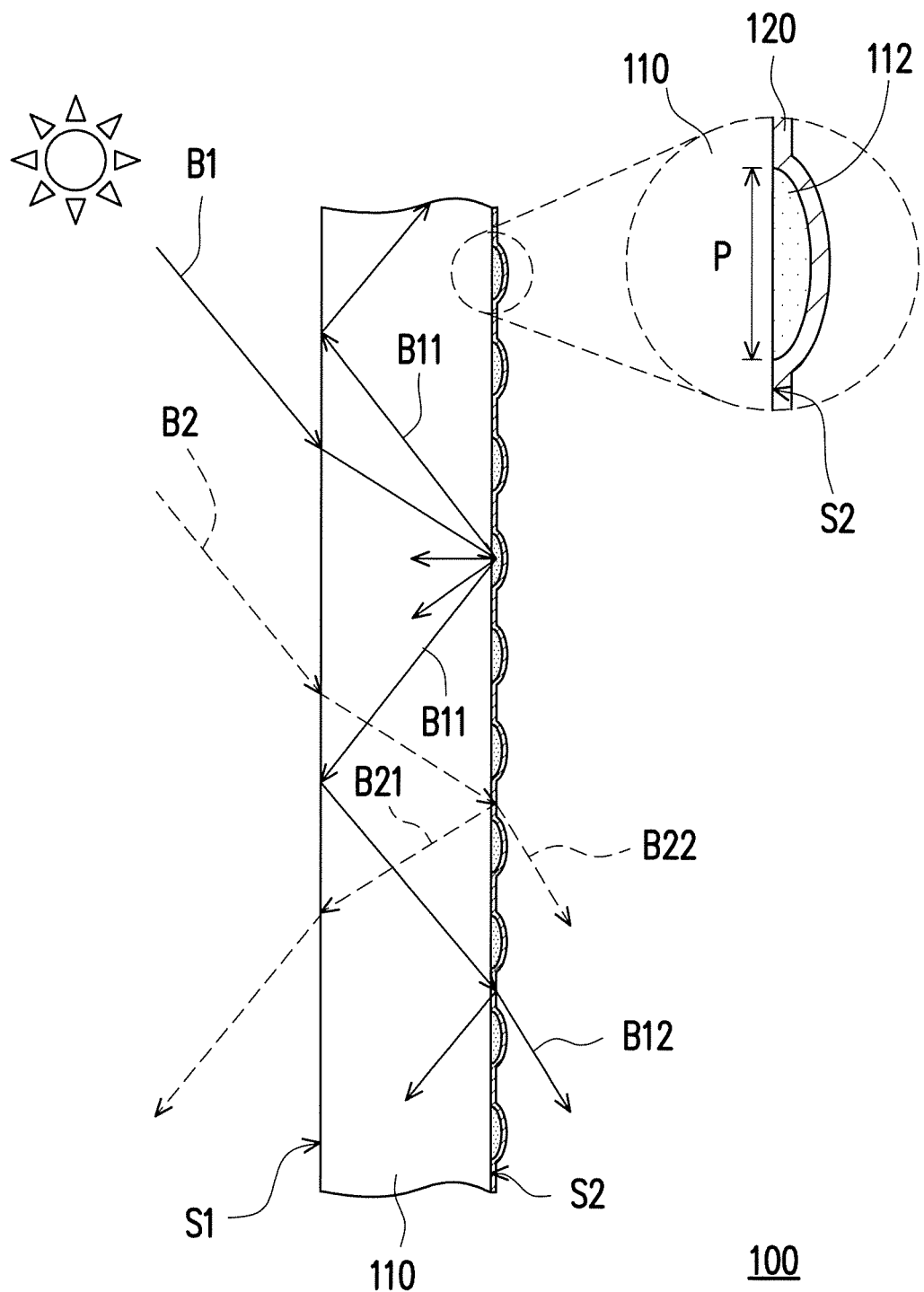
FIGS. 1 to 4 are cross-sectional views respectively illustrating an optical transmittance adjustment device according to the first to the fourth embodiments of the invention.

FIGS. 1 to 4 are cross-sectional views respectively illustrating an optical transmittance adjustment device according to the first to the fourth embodiments of the invention. Referring to FIG. 1, an optical transmittance adjustment device 100 includes a light guide plate 110 and an optical transmittance adjustment film 120.

The light guide plate 110 is, for example, a glass window, which should not be construed as a limitation to the invention. The light guide plate 110 has a first surface S1 and a second surface S2 opposite to the first surface S1. The first surface S1 is, for example, an external surface of the light guide plate 110, and the second surface S2 is, for example, an internal surface of the light guide plate 110. Specifically, external light beam B1 and B2 enter the light guide plate 110 via the first surface S1.

The second surface S2 has a plurality of light scattering microstructures 112. In the embodiment, the light scattering microstructures 112 are dots, respectively, and the material of the light scattering microstructures 112 adopts the material having the refractive index in a range of 1.46 to 2.5 such as silicon dioxide or titanium dioxide, which should not be construed as a limitation to the invention. In addition, a size P of the light scattering microstructures 112 falls within a range of tens of micrometers to hundreds of micrometers respectively so as to achieve a good scattering effect.

The light scattering microstructures 112 may be arranged in arrays at equal intervals, which should not be construed as a limitation to the invention. Depending on different needs, the light scattering microstructures 112 may have different distribution or arrangement. Since the angle of external light beam incident on the first surface S1 varies according to the longitude or altitude of the use regions, the light scattering microstructures 112 may be intensively distributed in a region of the second surface S2 close to the ceiling, close to the floor or a central region and so on. The light scattering microstructures 112 may be arranged at equal intervals or on a random basis.

The optical transmittance adjustment film 120 is disposed on one side of the light guide plate 110, and the light scattering microstructures 112 are disposed between the optical transmittance adjustment film 120 and light guide plate 110. In the embodiment, the optical transmittance adjustment film 120 is disposed on the second surface S2. For example, the optical transmittance adjustment film 120 may be formed on the second surface S2 via the means of coating or sputtering, which should not be construed as a limitation to the invention. In another embodiment, the optical transmittance adjustment film 120 may be formed on an alternative base. The optical transmittance adjustment film 120 is, for example, a transflective film. The transflective film allows a portion of the light beam to penetrate and reflect another portion of the light beam. For example, the optical transmittance of the transflective film may fall within a range of 40% to 60%, which should not be construed as a limitation to the invention. In another embodiment, the optical transmittance of the optical transmittance adjustment film 120 may fall within a range of 5% to 90%.

External light beam (e.g. light beams B1 and B2) enters the light guide plate 110 via the first surface S1, wherein the light beam B1 represents the light beam which enters the light guide plate 110 and is transmitted to the light scattering microstructures 112, and the light beam B2 represents the light beam which enters the light guide plate 110 and is transmitted to the second surface S2 between two adjacent light scattering microstructures 112.

Referring to the arrows in solid lines in FIG. 1, the light beam B1 which is transmitted to the light scattering microstructures 112 is scattered by the light scattering microstructures 112. The light beam B11 which is scattered in a big angle is transmitted toward both sides (e.g. upper and lower sides in the drawing) of the light guide plate 110 via total internal reflection (TIR), wherein a portion of the light beam B11 passes through the second surface S1 after being reflected by the first surface S1 and is transmitted to the optical transmittance adjustment film 120. The optical transmittance adjustment film 120 reflects a portion of the light beam B11 back to the inside of the light guide plate 110 so that only a portion of the light beam B11 (e.g. light beam B12) passes through the optical transmittance adjustment film 120.

Referring to the arrows in dashed lines in FIG. 1, the light beam B2 which is transmitted to the second surface S2 between the two adjacent light scattering microstructures 112 passes through the second surface S2 and is transmitted to the optical transmittance adjustment film 120, wherein a portion of the light beam B2 (e.g. light beam B21) is reflected back to the inside of the light guide plate 110 via the optical transmittance adjustment film 120 so that only a portion of the light beam B2 (e.g. light beam B22) passes through the optical transmittance adjustment film 120.

In the embodiment, with the light scattering microstructures 112 which scatters the light beam (e.g. light beam B1) entering the light guide plate 110, the proportion of light beam that is emitted from the second surface S2 of the light guide plate 110 may be reduced. In addition, with the characteristics of the optical transmittance adjustment film 120 which reflects a portion of the light beam, the proportion of the light beam B12 and B22 that pass through the optical transmittance adjustment film 120 may be further decreased. Based on the above, the optical transmittance adjustment device 100 can block external light beam from entering a space, thereby at least achieving the effect of blocking sunlight. In one embodiment, the light beam B11 which is transmitted toward the upper side of the light guide plate 110 via total internal reflection may further be used for supplementary illumination or decorative illumination at the ceiling. The light beam B11 that is transmitted toward the lower side of the light guide plate 110 may further be used for supplementary illumination or decorative illumination on the ground.

Figure 2:
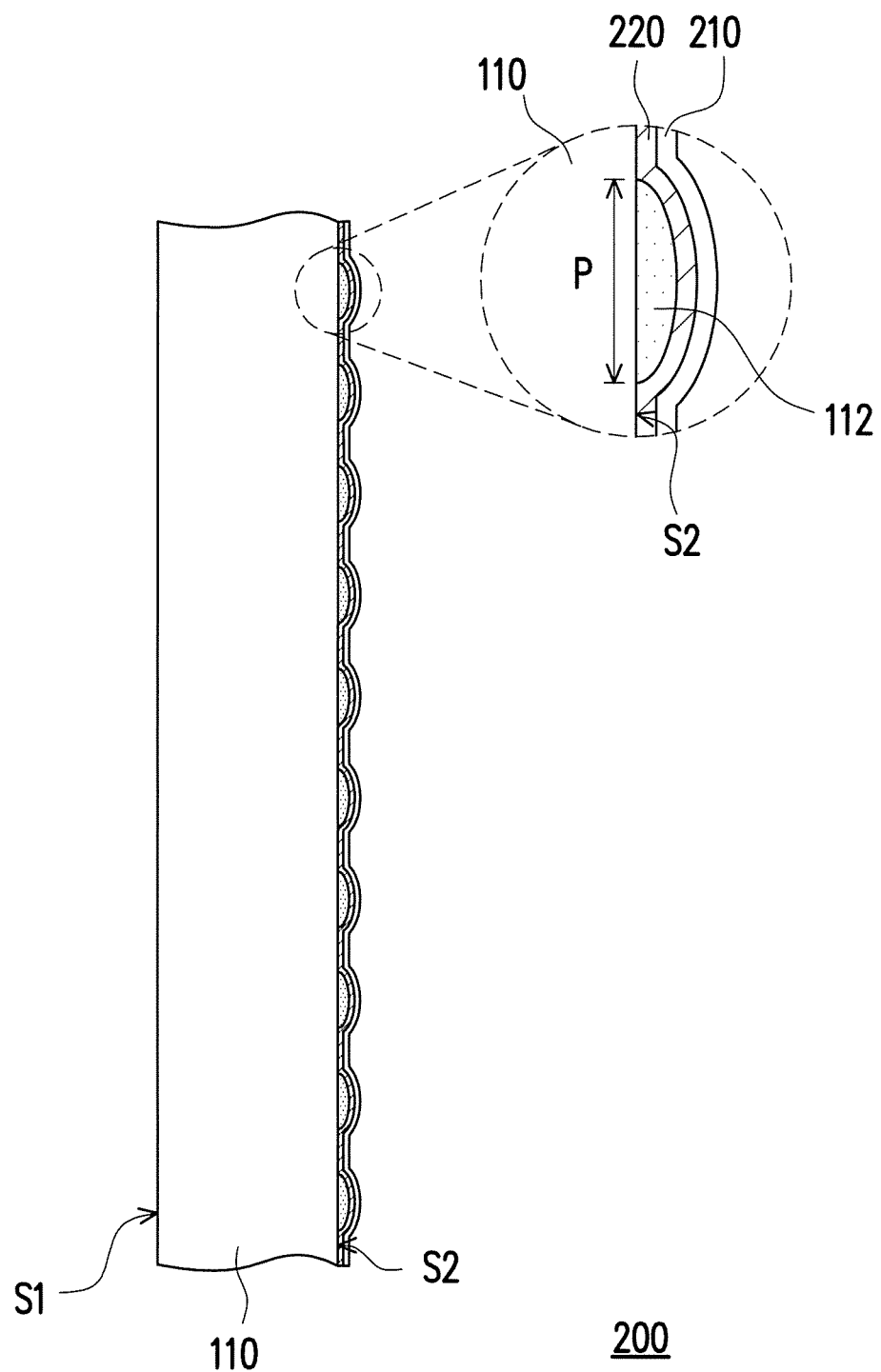
Figure 3:
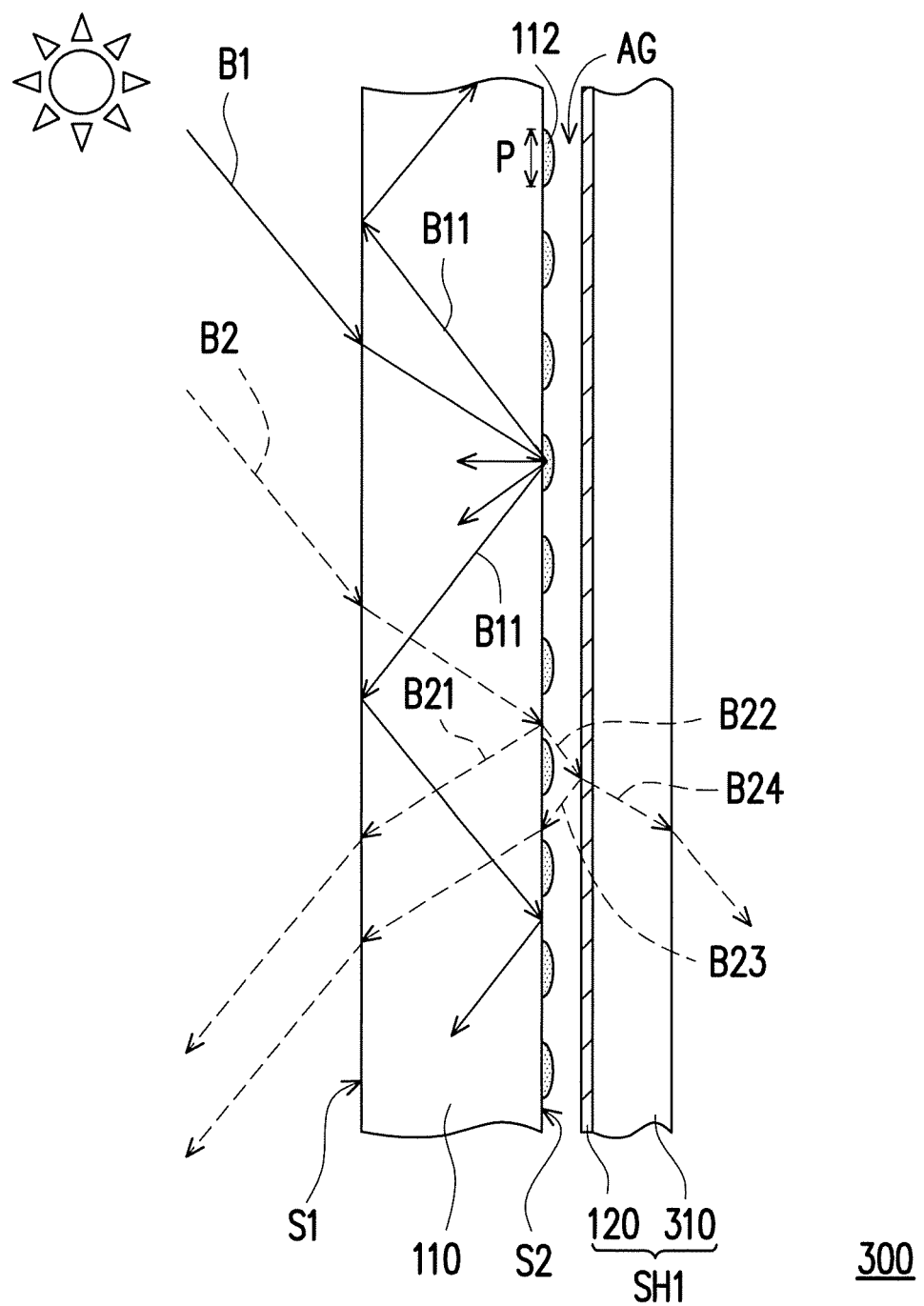
Figure 4:
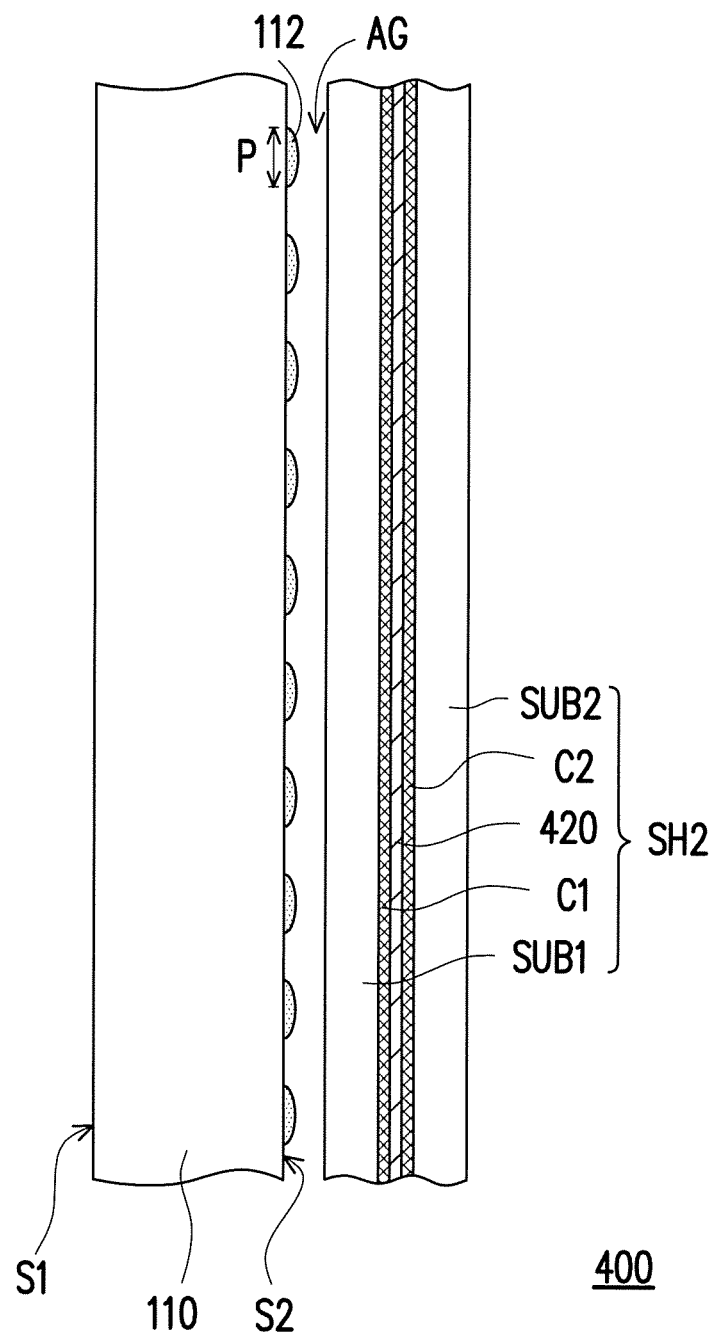

FIGS. 2-4 are incorporated below for describing other implementations of the optical transmittance adjustment device, wherein identical elements are denoted by identical reference numerals, and no repetition is incorporated herein.

Referring to FIG. 2, the difference between an optical transmittance adjustment device 200 and the optical transmittance adjustment device 100 is described as follows. In the optical transmittance adjustment device 200, an optical transmittance adjustment film 220 is a photochromic film. The characteristics of the photochromic film are that the optical transmittance thereof is decreased due to light irradiation and the light absorption rate thereof is increased due to light irradiation; with such feature, the proportion of the light beam that passes though the optical transmittance adjustment film 220 and enters a space may be reduced, thereby achieving the effect of blocking sunlight. For example, the optical transmittance of the photochromic film may fall within a range of 10% to 90%, which should not be construed as a limitation to the invention. In addition, the optical transmittance adjustment device 200 may further include a hard-coating layer 210. The photochromic film 220 is covered by the hard-coating layer 210 to provide proper protection (e.g. scratch resistance) for the optical transmittance adjustment film 220.

Referring to FIG. 3, the difference between an optical transmittance adjustment device 300 and the optical transmittance adjustment device 100 is described as follows. The optical transmittance adjustment device 300 further includes a transparent substrate 310, wherein the optical transmittance adjustment film 120 is forming on the transparent substrate 310. In the embodiment, the optical transmittance adjustment film 120 is a transflective film, which should not be construed as a limitation to the invention. In another embodiment, the optical transmittance adjustment film 120 may be a photochromic film.

An optical transmittance adjustment unit SH1 is constructed by the optical transmittance adjustment film 120 and the transparent substrate 310, and an air gap AG exists between the optical transmittance adjustment unit SH1 and the light guide plate 110. As such, the effect of heat dissipation/thermal insulation can be achieved by the means of heat convection. In addition, the optical transmittance adjustment film 120 disposed on the transparent substrate 310 can reflect a portion of the light beam B22 (e.g. light beam B23) that passes through the second surface S2 and transmitted to the optical transmittance adjustment film 120 back to the light guide plate 110 so as to enhance utilization of light (e.g. for use of supplementary illumination or decorative illumination) so that only a portion of the light beam B22 (e.g. light beam B24) passes through the optical transmittance adjustment unit SH1. In other words, the optical transmittance adjustment device 300 not only can achieve the effect of heat dissipation/thermal insulation, but also can further improve the effect of blocking sunlight.

Referring to FIG. 4, the difference between an optical transmittance adjustment device 400 and the optical transmittance adjustment device 100 is described as follows. The optical transmittance adjustment device 400 further includes a first transparent substrate SUB1, a second transparent substrate SUB2, a first transparent conductive layer C1 and a second transparent conductive layer C2. The optical transmittance adjustment film 420 is disposed between the first transparent substrate SUB1 and the second transparent substrate SUB2, and the first transparent substrate SUB1 and the second transparent substrate SUB2 may be a glass substrate or a plastic substrate, respectively. The first transparent conductive layer C1 is disposed between the first transparent substrate SUB1 and the optical transmittance adjustment film 420. The second transparent conductive layer C2 is disposed between the second transparent substrate SUB2 and the optical transmittance adjustment film 420. The first transparent conductive layer C1 and the second transparent conductive layer C2 may respectively be a metal oxide conductive layer, a nano metal conductive wire, a graphene layer or a metal mesh electrode layer, which should not be construed as a limitation to the invention.

The optical transmittance adjustment film 420 is, for example, an electro-chromic film. The characteristics of the electro-chromic film is that the optical transmittance and light absorption rate thereof can change along with the potential difference between the first transparent conductive layer C1 and the second transparent conductive layer C2; with such feature, the proportion of the light beam that passes through the optical transmittance adjustment film 420 can be changed through modulating the potential difference between the first transparent conductive layer C1 and the second transparent conductive layer C2 depending on the need, thereby achieving the effect of blocking sunlight. For example, the optical transmittance of the electro-chromic film may be in a range of 5% to 85%, which should not be construed as a limitation to the invention.

An optical transmittance adjustable device SH2 is constructed by the first transparent substrate SUB1, the first transparent conductive layer C1, the optical transmittance adjustment film 420, the second transparent conductive layer C2 and the second transparent substrate SUB2, and the air gap AG exists between the optical transmittance adjustable device SH2 and the light guide plate 110. As such, the effect of heat dissipation/thermal insulation can be achieved by the means of heat convection. In addition, the optical transmittance adjustment film 420 can reflect a portion of the light beam that passes through the second surface S2 and transmitted to the optical transmittance adjustment film 420 back to the light guide plate 110 so as to enhance utilization of light (e.g. for use of supplementary illumination or decorative illumination while reducing the proportion of the light beam emitted from the optical transmittance adjustable device SH2. In other words, the optical transmittance adjustment device 400 not only can achieve the effect of heat dissipation/thermal insulation but also can improve the effect of blocking sunlight.

In summary of the above, in the embodiments of the invention, by using the light scattering microstructures that scatter the light beam entering the light guide plate, the proportion of the light beam emitted from the second surface of the light guide plate may be reduced. In addition, with the characteristics of the optical transmittance adjustment film that absorbs or reflects light beam, the proportion of the light beam that passes through the optical transmittance adjustment film may be further decreased. As such, the optical transmittance adjustment device of the invention can achieve the effect of blocking sunlight. In one embodiment, the light beam that is transmitted toward the upper and lower sides of the light guide plate (window) via total internal reflection can further be used for supplementary illumination or decorative illumination. In another embodiment, the air gap may exist between the optical transmittance adjustment film and the light guide plate so as to achieve the effect of heat dissipation/thermal insulation and further enhance the effect of blocking sunlight.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. An optical transmittance adjustment device, comprising:
    a light guide plate, comprising a first surface and a second surface, wherein the second surface is opposite to the first surface and comprises a plurality of light scattering microstructures; and
    an optical transmittance adjustment film, disposed on a side of the light guide plate, and the light scattering microstructures being disposed between the optical transmittance adjustment film and the light guide plate,
    wherein the optical transmittance adjustment device is disposed between an interior space and an exterior space, and the first surface of the light guide plate is located between the second surface of the light guide plate and the exterior space, an ambient beam from the exterior space enters the interior space by sequentially passing through the first surface, the second surface comprising the plurality of light scattering microstructures, and the optical transmittance adjustment film.

2. The optical transmittance adjustment device according to claim 1, wherein the light scattering microstructures are respectively dots.

3. The optical transmittance adjustment device according to claim 1, wherein a size of the light scattering microstructures falls within tens of micrometers to hundreds of micrometers, respectively.

4. The optical transmittance adjustment device according to claim 1, wherein optical transmittance of the optical transmittance adjustment film falls within a range of 5% to 90%.

5. The optical transmittance adjustment device according to claim 1, wherein the optical transmittance adjustment film is formed on the second surface.

6. The optical transmittance adjustment device according to claim 5, wherein the optical transmittance adjustment film is a transflective film.

7. The optical transmittance adjustment device according to claim 5, wherein the optical transmittance adjustment film is a photochromic film, and the optical transmittance adjustment device further comprises a hard-coating layer, the photochromic film is covered by the hard-coating layer.

8. The optical transmittance adjustment device according to claim 1, further comprising a transparent substrate, wherein the optical transmittance adjustment film is formed on the transparent substrate to construct an optical transmittance adjustment unit, an air gap exists between the optical transmittance adjustment unit and the light guide plate.

9. The optical transmittance adjustment device according to claim 8, wherein the optical transmittance adjustment film is a transflective film or a photochromic film.

10. The optical transmittance adjustment device according to claim 1, further comprising a first transparent substrate, a second transparent substrate, a first transparent conductive layer and a second transparent conductive layer, wherein the optical transmittance adjustment film is disposed between the first transparent substrate and the second transparent substrate, the first transparent conductive layer is disposed between the first transparent substrate and the optical transmittance adjustment film, the second transparent conductive layer is disposed between the second transparent substrate and the optical transmittance adjustment film, the optical transmittance adjustment film is an electro-chromic film, and an optical transmittance adjustable device is constructed by the first transparent substrate, the first transparent conductive layer, the optical transmittance adjustment film, the second transparent conductive layer and the second transparent substrate, an air gap exists between the optical transmittance adjustable device and the light guide plate.

* * * * *